United States Patent [19]

Totten et al.

[11] 4,106,457

[45] Aug. 15, 1978

[54] DRY GASEOUS FUEL GENERATOR

[76] Inventors: George F. Totten, 4400 Smoke Ranch Rd., Las Vegas, Nev. 89108; Wayne L. Harman, 5958 Pence Way, Las Vegas, Nev. 89119

[21] Appl. No.: 743,044

[22] Filed: Nov. 18, 1976

[51] Int. Cl.² .................................... F02M 31/00
[52] U.S. Cl. ................... 123/133; 123/122 E; 123/141; 261/145; 48/180 R
[58] Field of Search ............ 123/133, 122 E, 127, 123/141, 34 A; 261/144, 145; 48/180 R

[56] References Cited

U.S. PATENT DOCUMENTS

| 1,530,882 | 3/1925 | Chapin | 123/122 E |
|---|---|---|---|
| 1,600,007 | 9/1926 | Mock | 123/133 |
| 1,980,496 | 11/1934 | Musselwhite | 123/133 |
| 3,931,801 | 1/1976 | Rose | 123/122 E |

Primary Examiner—Ronald H. Lazarus
Attorney, Agent, or Firm—Raymond L. Madsen

[57] ABSTRACT

There is disclosed apparatus for converting liquid fuel into a highly combustible dry gaseous fuel for internal combustion engines comprising a fuel injector connected to a heated baffle chamber containing a multiplicity of baffles, heated to the exhaust temperature of an internal combustion engine. The heated baffle chamber in turn communicates with an unheated baffle chamber containing a plurality of unheated baffles, which in turn communicates with a distribution chamber with throttle valves and a venturi to controllably disperse the dry gaseous fuel mixed with air into the intake manifold of an internal combustion engine.

15 Claims, 8 Drawing Figures

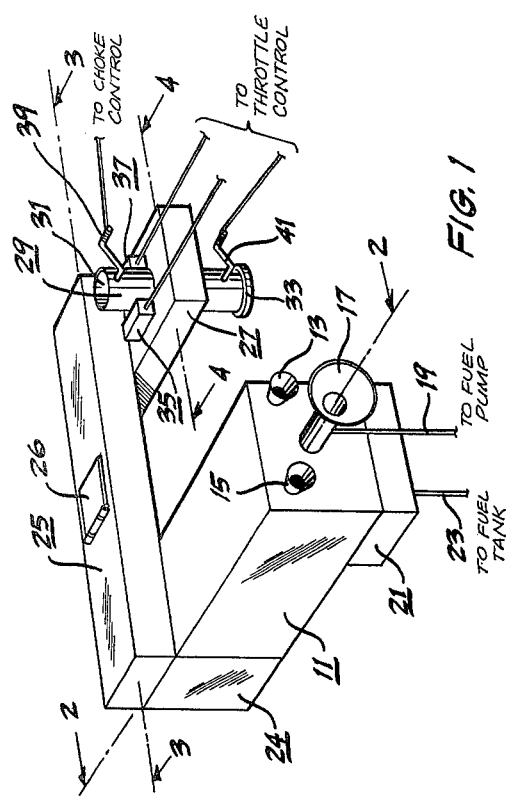

DRY GASEOUS FUEL GENERATOR

The present invention relates to fuel generators for internal combustion engines and more particularly to the preparation of a dry gaseous fuel for internal combustion engines directly from liquid gasoline or the like.

In the field of fuel generators for internal combustion engines, it has been the general practice to employ carburetors to perform the mixing of a jet of liquid fuel with air to form a combustible mixture. Although such devices have served the purpose, they have not proved entirely satisfactory under all conditions of service for the reason that considerable difficulty has been experienced in eliminating the introduction of fuel in a liquid state into the combustion chamber and difficulties encountered in obtaining complete combustion of the air and liquid fuel mixture.

Those concerned with the development of fuel generators for internal combustion engines have long recognized the need for a fuel generator that forms a highly combustible fuel vapor from liquid fuel for maximum power and efficiency. An attempt to produce such a generator is disclosed in U.S. Pat. No. 2,742,886 granted to C. W. McPherson, wherein liquid fuel is placed in a cylindrical chamber surrounded by a water jacket connected with the water cooling system for the engine. The water jacket keeps the cylindrical chamber at normal engine operating temperatures. Air is driven into the cylindrical chamber by an air compressor which forces air downwardly through an inflow pipe which has an opening below the surface of the liquid fuel contained in the chamber. The air inflow percolates up through the liquid fuel to form a mixture of air and fuel vapor. A tandem combination of gauze baffle and labyrinth baffle tend to remove large droplets of fuel in the vapor and air mixture to form a dry vapor. The dry vapor is then discharged from the cylindrical chamber through a regulator and into the carburetor of the internal combustion engine. Although such a gas generator has served the purpose, it has not proved entirely satisfactory under all conditions of service for the reason that the temperature of the air and gas mixture is limited to the coolant temperature which is not sufficient to generate an air and fuel mixture sufficiently free from droplets of liquid fuel which will undergo complete combustion within the internal combustion engine to produce maximum power and efficiency. The cooling effect of the liquid fuel in the cylinder chamber upon the coolant flowing in the water jacket surrounding the cylinder chamber has a tendency to cause the engine to operate at below normal operating temperatures. These difficulties are overcome by the present invention.

One of the most critical problems confronting designers of dry fuel vapor generators for internaL combustion engines has been the production of a truly gaseous vapor which contains no liquid fuel droplets and cannot be condensed back into liquid fuel as it progresses through the fuel system of the internal combustion engine. This problem is overcome by the present invention.

The general purpose of this invention is to provide a dry gaseous fuel generator for internal combustion engines which embraces all the advantages of similarly employed fuel generators and possesses none of the aforedescribed disadvantages. To attain this, the present invention contemplates a unique liquid fuel jet in combination with a labyrinth baffle internally heated by the exhaust gases of an internal combustion engine or by other heating devices to temperatures in excess of 250° to 320° F. whereby a super dry gaseous fuel is formed and the the existence of any fuel vapor with liquid droplets therein is eliminated.

One of the objects of this invention is to generate a super dry gaseous fuel from a liquid fuel for substantially complete combustion with maximum power in internal combustion engines.

Still another object of this invention is to provide a dry gaseous fuel from a liquid fuel for improving the efficiency and minimizing the exhaust pollution of internal combustion engines.

Still another object of this invention is to provide high temperature drying of a liquid fuel spray and air mixture jet for converting liquid fuel or the like to a super dry gaseous fuel and air mixture for introduction into the intake manifold of an internal combustion engine.

Yet another object of this invention is to provide an improved dry vapor fuel generator which can be utilized with a liquid fuel injection system by which all the liquid fuel is converted into a highly combustible super heated dry gaseous mixture.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates a perspective view of the exterior of a preferred embodiment of a dry gaseous fuel generator;

FIG. 2 illustrates a section of ghe generator of FIG. 1 taken on the line 2—2, looking in the direction of the arrows;

FIG. 3 shows a section of the generator of FIG. 1 taken on the line 3—3, looking in the direction of the arrows:

Figure 4:
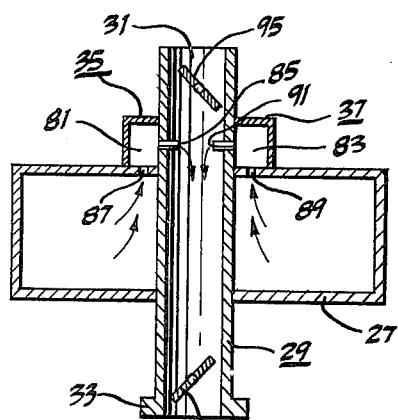
FIG. 4 illustrates a section of the generator of FIG. 1 taken on the line 4—4, looking in the direction of the arrows.

Referring now to the drawings wherein like reference characters designate like or corresponding parts throughout the several views, there is shown in FIG. 1 a heated or high temperature baffle chamber 11 having air intake scoops 13, 15 and 17 mounted through one end thereof, a fuel line 19 being connected through air intake 17 to a fuel spray jet (not visible). A fuel sump or fuel collection chamber 21 is attached to the underside of heated baffle chamber 11 adjacent the one end thereof and further has a fuel outlet conduit or tube 23 extending from the bottom thereof for connection to the gas tank of an internal combustion engine. The other end of heated baffle chamber 11 is attached to an unheated baffle chamber 24 which in turn is attached to one end of a conveyor chamber or conduit 25 having a backfire biased flap valve 26 thereon. The other end of conveyor chamber 25 is connected to a distribution chamber 27 into which venturi pipe 29 is mounted and passes therethrough. Venturi 29 has an air intake opening 31 at one end and a flange 33 surrounding the opening in the other end thereof. Sliding valve assemblies 35 and 37 connect the interior of venturi 29 with the interior of distribution chamber 27. A butterfly choke valve assembly 39 is mounted adjacent opening 31 of venturi 29 and a butterfly throttle valve assembly 41 is mounted adjacent flange 33 at the other end of venturi 29.

Turning now to FIG. 2, there is illustrated a cross section of heated or high temperature baffle chamber 11 and unheated baffle chamber 24. Air intake 15, identical to air intake 13 of FIG. 1, has one end immersed in liquid fuel collected in a fuel sump or liquid fuel container 21. Main intake or air scoop 17 has a hinged one-way flapper valve 16 therein allowing air to enter into heated baffle chamber 11 but preventing air and fuel mixture from escaping in the reverse direction from the chamber. A fuel pump 18 is connected by a fuel conduit or tubing 19 with a fuel spray jet 55 centrally located within air intake 17 at the end thereof within chamber 11. Fuel pump 18 is connected by a conduit or tubing 22 with a gasoline tank 20 which in turn is connected by conduit or tubing 23 to fuel sump 21. A float arm 43 is rotatably mounted within fuel sump 21 and has a float 45 attached to the free end thereof. A valve pin 47 is attached to arm 43 and mates with a valve seat 49 to open and close conduit 23 and permit liquid fuel to flow from gas sump 21 into gasoline tank 20. Fuel sump or fuel collection chamber 21 is connected to heated baffle chamber 11 through a mesh or screen 50 having openings or holes 51 therethrough. Opposite fuel spray jet 53, adjacent the end of air scoop or intake 17 is a spray baffle plate 55 against which the liquid fuel from jet 53 is directed. Behind spray baffle plate 55 is a heated hollow dome baffle 57 which is connected by a conduit 59 with a rectangular hollow baffle plate 61. A pipe or tubing connection (not visible) is connected from the exhaust system of the internal combustion engine to heated dome baffle 57 and transports hot exhaust gases into the interior of dome 57. Rectangular hollow baffle plate 61 is connected by a conduit 64 with a rectangular hollow baffle plate 65. Rectangular baffle plate 65 is shaped like a hollow rectangular donut with a central rectangular hole 67 therethrough. Between hollow rectangular baffle 61 and hollow rectangular baffle 65 is a flat solid baffle plate 63. A series of five hollow rectangular baffles 65 are connected in tandem by conduits 64 and are interleaved with a series of five rectangular solid baffle plates 63. Each of the hollow rectangular baffles 65 are connected such that the hot exhaust gases flow through one to the other of the series. The last in the series of rectangular hollow baffles 65 is connected by conduit 64 to rectangular hollow baffle 66 which in turn is connected by a conduit (not illustrated) into the exhaust system of the internal combustion engine.

At the end of the tandem or series string of rectangular hollow donut baffles 65 is located unheated baffle chamber 24 containing labyrinth baffles 69 in tandem or series with a screen or mesh 71 having openings or holes 73 therethrough. Centrally located adjacent screen 71 is a rectangular baffle plate 75. On the other side of baffle plate 75 is located a screen or mesh 77 having openings or holes 79 therethrough into conveyor chamber 25.

FIG. 3 illustrates a cross section of conveyor chamber 25 showing sieve or screen 77 with openings 79 into conveyor chamber 25. Centrally located on the top of conveyor chamber 25 is backfire valve 26 comprising a rectangular door-like flap rotatably mounted on conveyor chamber 25 and biased with a spring (not visible) in a normally closed position. The other end of conveyor chamber 25 is connected to distribution chamber 27.

FIG. 4 shows a cross section of distribution chamber 27 and venturi 29. Venturi 29 passes entirely through distribution chamber 27 and has upper opening 31 into which air enters. The bottom end of venturi 29 has flange 33 attached thereto for connection to the intake manifold of an internal combustion engine. Sliding valve assembly 35 and sliding valve assembly 37 are mounted diagonally opposite each other on either side of venturi 29 with sliding valve assembly 35 having a sliding valve 81 slidably mounted therein and sliding valve assembly 37 having a sliding valve 83 slidably mounted therein. Sliding valve 81 moves to close or open a path between a port of hole 87 in distribution chamber 27 with a port or hole 85 in venturi 29. Similarly, sliding valve 83 opens and closes a path between a hole or port 89 in distribution chamber 27 and an opening or port 91 in venturi 29. Venturi 29 further has a butterfly throttle valve 93 located adjacent the lower flange opening therein and has a choke butterfly valve 95 adjacent upper air intake opening 31. Venturi 29 may be a venturi of the type used with conventional carburetors and well known to automotive designers and mechanics.

Figure 5:
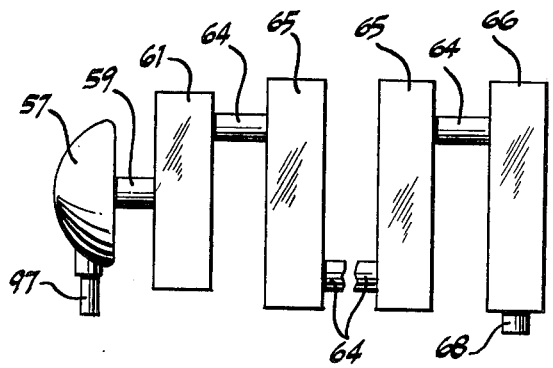
FIG. 5 illustrates a top plan view, partly cut-away, of the high temperature baffles of the present invention.

FIG. 5 illustrates a top view of the tandem or series connected heated rectangular hollow baffle plates with the repeated portions cut away. An exhaust input conduit 97 is connected into hollow baffle dome 57 which in turn is connected by conduit 59 to rectangular hollow baffle plate 61. Conduit 64 connects hollow baffle plate 61 with rectangular hollow donut baffle plate 65. The repeated series of hollow baffle plates 65 connected by conduits 64 is omitted. The last in the series of hollow baffles 65 is connected by conduit 64 to final hollow donut baffle plate 66, which in turn has an exhaust output conduit 68 connected thereto for transporting the exhaust gases back into the exhaust system of the internal combustion engine.

Figure 6:
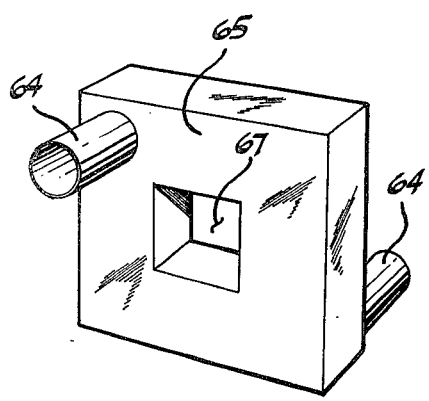
FIG. 6 illustrates a perspective view of one of the high temperature baffles.

FIG. 6 illustrates a typical heated rectangular donut baffle 65 having input and output conduits 64 connected thereto for the ingress and egress of exhaust gases into and from the interior thereof. A central rectangular hole 67 therethrough gives the configuration the appearance of a square donut.

Figure 7:
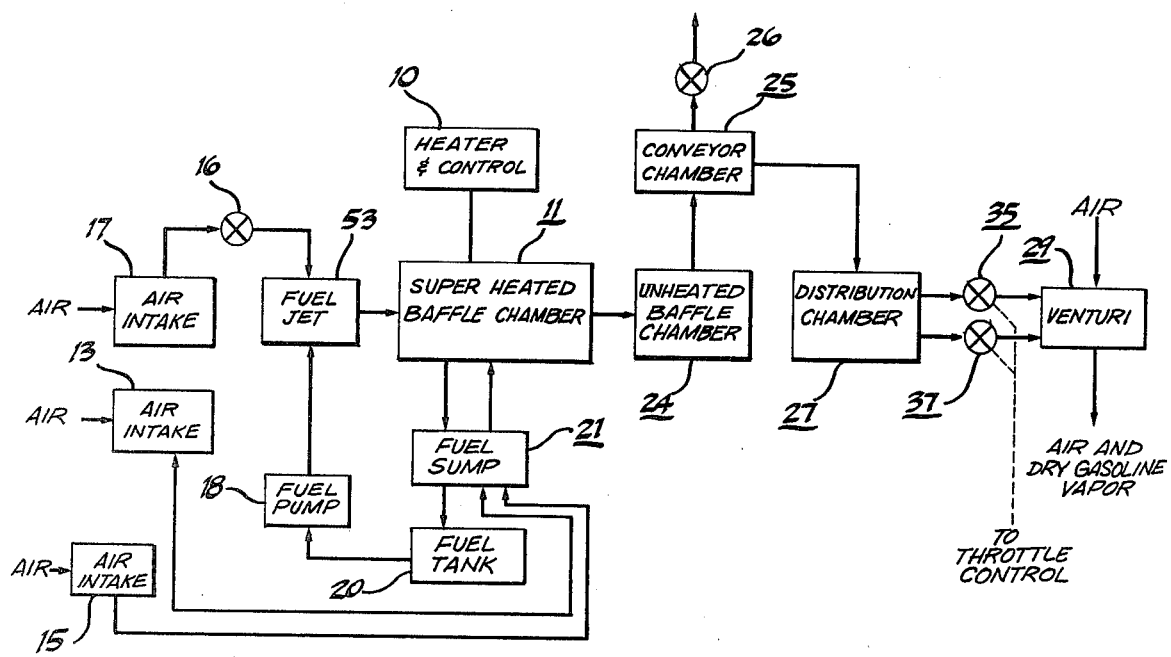
FIG. 7 illustrates a block diagram of the functional and cooperative relation between certain elements of the present invention.

FIG. 7 shows a block diagram of the major elements of the invention. Air intake 17 is connected through one-way air intake valve 16 to gasoline jet 53 which in turn is connected into heated baffle chamber 11. Heater and control 10 is connected to heated baffle chamber 11 for heating and controlling the temperature of the baffles therein. Air intakes 13 and 15 are connected into fuel sump 21. Fuel tank 20 is connected to fuel pump 18, which in turn is connected to fuel jet 53. Fuel is sprayed in the direction of the arrow into heated baffle chamber 11. Super dry gaseous fuel flows in the direction of the arrow from chamber 11 into unheated baffle chamber 24. From there, the dry gaseous fuel flows in the direction of the arrow to conveyor chamber 25 having backfire valve 26 connected thereto which allows burning gases to flow in the direction of the arrow out of the conveyor chamber through valve 26 into the atmosphere should a backfire occur. The dry gaseous fuel flows from conveyor chamber 25 in the direction of the arrow into distribution chamber 27 from which the dry gaseous vapor flows through sliding throttle valves 37 and 35 in the direction of the arrows into venturi 29.

Figure 8:
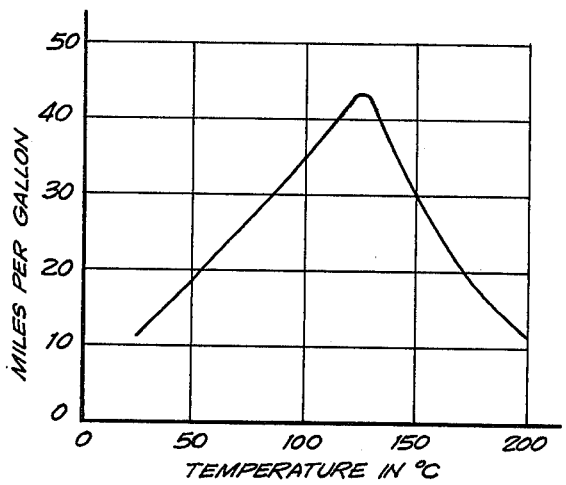
FIG. 8 illustrates a graph of miles-per-gallon versus baffle temperature of the preferred embodiment.

In FIG. 8 a graph of miles-per-gallon plotted against baffle temperature shows that for the particular configuration of baffles and air intake illustrated in FIGS. 1-6, a maximum miles-per-gallon is reacted at approximately 256.5° F or 125° C. The optimum temperature will vary depending upon the volume of air introduced with the gasoline at the input to the baffle chamber and the volume and temperature of the air added to the gaseous dry fuel in the venturi. The temperature of the baffles and the volume of air mixed with the gasoline and dry gaseous fuel affect the temperatures of the air-fuel mixture and the air-to-fuel ratio which in turn affect combustion and volumetric expansion upon combustion.

The general operation of the invention can best be explained by reference to FIG. 7 where air is drawn into air intake 17 which passes by air intake valve 16 and is mixed with fuel spray generated by fuel jet 53 and the mixture directed into heated baffle chamber 11 wherein the fuel spray is converted into a super dry gaseous vapor by heating the baffles interior to baffle chamber 11 to temperature at or above the range of 250° to 300° F, by heater and control 10. Fuel vapors such as gasoline heated to these temperatures or above are in a super heated gaseous phase heretofore never realized or produced in fuel generators and having substantially no liquid droplets or vapor which will condense upon striking a cooler surface. Once this super heated dry gaseous phase is obtained, the dry fuel phase can be maintained for many days in the distribution chamber. The liquid fuel which is not converted into the dry gaseous phase is returned to fuel tank 20. Fuel pump 18 obtains fuel from fuel tank 20 to drive duel jet 53. Air intakes 13 and 15 provide air into fuel sump 21 where the air is bubbled through the fuel collected therein to further provide a source of fuel vapor which is directed into heated baffle chamber 11 to be converted into a dry gaseous fuel. To further prevent the escape of liquid droplets of fuel or fuel in the vapor phase, unheated baffle chamber 24 removes any of the remaining liquid droplets of fuel that may escape from the heated baffle chamber 11 by slowing the flow of air and fuel mixture through heated baffle chamber 11 to insure proper heating of the mixture and by condensing the vapor or droplets on the unheated baffle surfaces. From unheated baffle chamber 24 the dry gaseous fuel is directed through conveyor chamber 25 into distribution chamber 27 where it is collected. From distribution chamber 27 the dry gaseous fuel may exit into venturi 29 and through sliding throttle valve assemblies 35 and 37. The stability of the dry gaseous fuel in distribution chamber 27 is extremely good and the distribution chamber may still be found to contain the dry gaseous fuel after many days of non-use. By opening and closing throttle valves 35 and 37 through a throttle control mechanism, the amount of dry gaseous fuel that is fed into venturi 29 can be controlled and hence, the speed of the internal combustion engine. Air is taken into venturi 29 and mixed with the dry gaseous fuel and directed into the intake manifold of the engine for combustion therein.

The detailed operation of the invention can best be described by turning to FIG. 2. Here fuel pump 18 drives fuel through tubing or fuel conduit 19 into fuel spray jet or fuel injector 53 where a spray of liquid fuel is directed against spray baffle 55. Air collected by air intake 17 is mixed with the liquid spray and droplets of liquid fuel as the air passes by jet 53 and spray baffle 55. One-way flapper valve 16 prevents the fuel vapor spray from migrating out of the air intake 17 to create an explosive or hazardous environment. The mixture of liquid spray and fuel droplets and air is then passed in the direction of the straight or curved arrows over hollow baffle dome 57 which is heated by exhaust gases directed therethrough. The exhaust gases pass through baffle dome 57 and rectangular hollow baffle 61 and through the entire series or tandem connection of rectangular hollow donut baffles 65 in the direction of the wavy arrows. The last of the series of rectangular donut baffle plates is connected to an exhaust outlet where the hot exhaust gases are directed back into the exhaust system of the engine. Therefore, as the exhaust gases pass from dome baffle 57 to output baffle 56, the exhaust gases heat the hollow baffles to the high exhaust temperatures. Temperature of the baffles may be controlled automatically or manually by a valve in the conduit from the exhaust system. As the air and liquid fuel spray mixture passes over the heated baffles, it is heated to a high temperature which starts the conversion of the liquid spray and air mixture into a dry gaseous fuel, the nature of which is not achieved in any of the devices used heretofore due to lack of sufficient heat used therein. The gasoline or fuel in the vapor state passes by dome 57 and rectangular baffle 61 around solid baffle plate 63 and through central opening 67 in the first of the series of tandem heated baffles 65. Solid baffle plates 63 cause the gasoline or fuel vapor and air mixture to traverse a long tortuous past the heated surfaces of baffles 65 and through the central heated openings 67 of each. By the time the air and fuel vapor mixture reaches the last of the series or tandem connected heated baffles, it will be almost entirely converted into a super heated gaseous phase with substantially no liquid droplet content. To insure that there are no liquid droplets left, the air and gasoline mixture is further directed through the labyrinth baffles 69 where the flow of gaseous fuel is further slowed in speed and any remaining droplets are condensed out. Further, screen 71, baffle plate 75 and screen 77 remove any further liquid droplets that may remain in the dry gaseous fuel.

Again, it is important to note that once the fuel has reached this dry gaseous state, it will remain in this particular phase for long periods of time and will not condense into a liquid form. This is an important distinction over prior devices since none have achieved or utilized this particular state of gaseous phase of the fuel. Only by heating the baffles to exhaust temperatures and forcing an air and fuel jet spray mixture thereover can this state by adequately obtained.

Turning now to FIG. 3, the super dry gaseous fuel flows through opening 79 in screen or sieve 77 into conveyor chamber 25. The dry gaseous fuel then flows into distribution chamber 27. If there is a backfire from the engine which causes a flash or explosion back into conveyor chamber 25, flap valve 26 will open and release the forces and pressure therein and prevent the flash or flames from entering back into the heated baffle chamber 11 where liquid gasoline or fuel is present. Therefore, a dangerous explosion or fire is eliminated.

Directing the discussion now to FIG. 4, the dry gaseous fuel flows from distribution chamber 27 into the openings 87 and 89 in sliding valve assembly 35 and 37, respectively, As the throttle mechanism slides sliding valve 81 and sliding valve 83 in a direction to connect the path between opening 87 of the distribution chamber and opening 85 of the venturi and correspondingly between openings 89 and 91, the dry gaseous fuel will flow from distribution chamber 27 into the interior of venturi 29. Air entering into the top of venturi 29 through opening 31 will then mix with the dry gaseous fuel and be directed into the intake manifold of the internal combustion engine connected to flange 33 of venturi 29. When throttle butterfly valve 93, which may be mechanically connected to operate in synchronism with sliding valve assemblies 35 and 37 is fully open and sliding valve assemblies 35 and 37 are fully open to allow the dry gaseous fuel to enter venturi 29, then full power will be obtained from the engine by allowing the maximum amount of dry gaseous fuel to be directed into the intake manifold thereof. It has been found that this dry gaseous fuel will burn almost completely, leaving very little residue or carbon in the engine. It has also been found that very little carbon monoxide is produced and the residue is almost entirely carbon dioxide and water. Therefore, under these conditions of complete combustion, very little undesirable and unburned hydrocarbons are released into the atmosphere and any internal combustion engine utilizing the present invention will produce considerably less undesirable effluents and cause less pollution to the atmosphere.

Turning back to FIG. 2, the gasoline spray from spray jet 53, which is not converted into a vapor state and then into a dry gaseous state, is returned through holes 51 of screen or mesh 50 into fuel sump 21. Float 45 controls the opening between valve pin 47 and valve seat 49 to control the level of fuel in the fuel sump 21. When the level of fuel rises, float 45 opens the gap between valve pin 47 and valve seat 49 to allow fuel to flow back into gasoline tank 20. When the level has dropped sufficiently, float 45 lowers in position and closes valve pin 47 with valve seat 49 to stop any further flow of fuel from fuel sump 21. By having the opening of air intake 15 below the surface of the fuel level in fuel sump 21, air entering air intake 15 will bubble through the fuel in fuel sump 21 to help create further fuel vapors which will flow through mesh or screen 50 into heated baffle chamber 11.

Therefore, the return of gasoline through fuel sump 21 and the conversion of the gasoline vapor to a super heated dry gaseous fuel produce a highly economical fuel generator which enables almost complete combustion of the dry gaseous fuel generated thereby and returns all liquid fuel not converted into a gaseous state back into the fuel tank to be reuesed again.

It now should be apparent that the present invention provides a high temperature baffle arrangement which may be employed in conjunction with a fuel generator for producing a dry gaseous fuel to drive an internal combustion engine.

Although particular components, etc., have been discussed in connection with the specific embodiment of a super dry gaseous fuel generator constructed in accordance with the teachings of the present invention, others may be utilized.

Furthermore, it will be understood that although an exemplary embodiment of the present invention has been discussed and disclosed, other applications and mechanical arrangements are possible and that the embodiments disclosed may be subjected to various changes, modifications and substitutions without necessarily departing from the spirit of the invention.

What is claimed is:

1. Apparatus for converting liquid fuel into a highly combustible dry gaseous fuel for an internal combustion engine, comprising:
a heated baffle chamber having two ends, and having a multiplicity of heated baffles therein forming a long tortuous path therethrough;
injector means connected through one end of said heated baffle chamber for receiving and converting liquid fuel into a fine spray of droplets;
intake means mounted in said one end of said heated baffle chamber for receiving and mixing air with said fine spray of droplets;
means for heating said multiplicity of heated baffles in said heated baffle chamber to substantially the exhaust temperature of an internal combustion engine whereby said mixture of air and fine spray of droplets are converted into a substantially dry gaseous fuel;
an unheated baffle chamber connected to the other end of said heated baffle chamber and having a labyrinth of unheated baffles therein adapted to intercept and to slow the flow of said substantially dry gaseous fuel and to remove therefrom any remaining fuel in liquid form; and
distribution means adapted to receive the dry gaseous fuel from said unheated baffle chamber and to controllably disperse said dry gaseous fuel into the intake manifold of an internal combustion engine wherein said dry gaseous fuel is combusted.

2. The apparatus described in claim 1, wherein said multiplicty of heated baffles includes a plurality of baffles having hollow interiors which are connected together in tandem.

3. The apparatus described in claim 2 wherein said means for heating said multiplicity of heated baffles includes conduit connections between the first and the last of said hollow interiors connected together in tandem and the exhaust manifold of the internal combustion engine whereby hot exhaust gases are passed through said hollow interiors in tandem to heat said multiplicity of heated baffles.

4. The apparatus described in claim 3 wherein said injection means includes a fuel spray jet adapted to be connected to the fuel pump of an internal combustion engine.

5. The apparatus described in claim 4 wherein said injection means further includes a fuel sump for collecting the liquid fuel residue from said fuel spray jet, said fuel sump being adapted to be connected to the fuel tank of an internal combustion engine and to return the collected fuel thereto.

6. The apparatus described in claim 5 wherein said intake means includes an air scoop inside of which is mounted said fuel spray jet.

7. The apparatus described in claim 6 wherein said distribution means includes:
conduit means having one end connected to said unheated baffle chamber for receiving therefrom said dry gaseous fuel;
a distribution chamber connected to the other end of said conduit means for collecting and holding said dry gaseous fuel for distribution; and
throttle valve means connected to said distribution chamber and adapted to be connected to the venturi of an internal combustion engine whereby dry gaseous fuel is controllably dispensed from said distribution chamber into the venturi of the internal combustion engine.

8. The apparatus of claim 7 wherein said distribution means further includes a normally closed backfire valve connected to said conduit means, said valve being forced open when a backfire occurs to release the force and flame of the backfire therethrough to prevent ignition of the fuel from said fuel spray jet and the fuel collected in said fuel sump.

9. The apparatus of claim 8 wherein said injector means further includes:
- a sump valve for controlling the liquid fuel returned to the fuel tank thereby controlling the level of liquid fuel collected in said fuel sump; and
- an air intake conduit having one end thereof immersed in the liquid fuel of said fuel sump whereby air is bubbled through the liquid fuel to generate an additional mixture of fuel vapor and air directed to said multiplicity of heated baffles.

10. A dry gaseous fuel generator for replacing the carburetor of an internal combustion engine, comprising:
- a first air intake conduit;
- a fuel spray jet centrally located within said first air intake conduit, said spray jet being adapted to be connected to a source of liquid fuel and to break the liquid fuel into droplets;
- a first baffle chamber having two ends, one end of which contains said first air intake conduit mounted therethrough, and the other end of which is adapted to be connected to a second baffle chamber, said first baffle chamber being adapted to contain a multiplicity of heated baffles therein;
- a multiplicity of heated baffles arranged in tandem and mounted within said first baffle chamber, for providing a tortuous path therethrough for the droplets of fuel;
- means for heating said multiplicity of heated baffles to a temperature sufficient to convert the droplets of fuel into a dry gaseous fuel;
- a second baffle chamber connected to said other end of said first baffle chamber for receiving the dry gaseous vapor from said first baffle chamber, said second baffle chamber being adapted to receive a plurality of unheated baffles therein and having an output adapted to be connected to distribution means;
- a plurality of unheated baffles arranged in tandem within said second baffle chamber for removing any remaining droplets of fuel from the dry gaseous fuel received from said first baffle chamber; and
- distribution means connected to said output of said second baffle chamber and adapted to be connected to the intake manifold of an internal combustion engine for controllably admitting the dry gaseous fuel thereinto from said second baffle chamber for combustion.

11. The dry gaseous fuel generator described in claim 10 further including a liquid fuel collection chamber attached to said first baffle chamber adjacent said one end thereof for collecting the liquid fuel which may accumulate in said first baffle chamber from said fuel spray jet, said collection chamber being adapted to return the accumulated fuel to the source of fuel to which said fuel spray jet is connected.

12. The dry gaseous fuel generator described in claim 11 further including valve means connected between said collection chamber and the source of fuel for controlling the level of fuel accumulated in said collection chamber.

13. The dry gaseous fuel generator described in claim 12 further including a second air intake conduit mounted through said one end of said first baffle chamber, said second air intake conduit having one end thereof immersed in the fuel accumulated in said collection chamber.

14. The dry gaseous fuel generator described in claim 13 in which said distribution means comprises:
- a distribution chamber for collecting and holding dry gaseous fuel, said distribution chamber having at least one opening therein adapted to be connected to a sliding throttle valve;
- a conveyor chamber connected between said second baffle chamber and said distribution chamber for conveying the dry gaseous fuel from said second baffle chamber to said distribution chamber;
- a venturi having one end adapted to be connected to the intake manifold of an internal combustion engine and the other end thereof adapted to be connected to an air filter, said venturi having at least one opening in the side thereof adapted to be connected to a sliding throttle valve; and
- a sliding throttle valve connected between said at least one opening in said distribution chamber and said at least one opening in said venturi for admitting dry gaseous fuel from said distribution chamber into said venturi thereby providing dry gaseous fuel to the intake manifold.

15. The dry gaseous fuel generator described in claim 14 further including a butterfly choke valve rotatably mounted within said other end of said venturi and a butterfly throttle valve rotatably mounted within said one end of said venturi, said butterfly throttle valve being mechanically linked with said sliding throttle valve so as to operate in synchronism therewith for controllably mixing air with said dry gaseous fuel.

* * * * *